US005623643A

United States Patent [19]
Janssen et al.

[11] Patent Number: 5,623,643
[45] Date of Patent: Apr. 22, 1997

[54] TELECOMMUNICATION SYSTEM WITH IMPROVED RECONFIGURATION FLEXIBILITY HAVING FIRST AND SECOND COMMUNICATION MODULES WHERE NEW OPERATING SYSTEM IS TESTED WITH ISOLATED SECOND COMMUNICATION MODULES

[75] Inventors: Paul E. Janssen, Naperville; Keith W. Johnson, Sugar Grove; Gary L. Postiglione, Naperville, all of Ill.

[73] Assignee: Lucent Technologies Inc., Murray Hill, N.J.

[21] Appl. No.: 593,192

[22] Filed: Jan. 29, 1996

Related U.S. Application Data

[63] Continuation of Ser. No. 976,622, Nov. 16, 1992, abandoned.

[51] Int. Cl.$^6$ ........................................ G06F 3/00
[52] U.S. Cl. ..................... 395/500; 364/267; 364/268; 364/268.8; 364/DIG. 1; 395/182.01; 395/182.11
[58] Field of Search .................... 395/500, 575, 395/830, 831, 182.01, 182.11; 370/13, 17; 371/20.1

[56] References Cited

U.S. PATENT DOCUMENTS

| | | | |
|---|---|---|---|
| 4,755,995 | 7/1988 | Anderson et al. | 371/9 |
| 4,823,256 | 4/1989 | Bishop et al. | 371/9.1 |
| 5,010,550 | 4/1991 | Hirata | 371/8.2 |
| 5,014,261 | 5/1991 | Shinbashi et al. | 371/8.1 |
| 5,088,021 | 2/1992 | McLaughlin et al. | 371/9.1 |
| 5,091,902 | 2/1992 | Chopping et al. | 371/8.1 |
| 5,105,420 | 4/1992 | Ardon et al. | 371/8.2 |
| 5,119,488 | 6/1992 | Takamatsu et al. | 371/8.2 |
| 5,140,592 | 8/1992 | Idleman et al. | 371/8.1 |
| 5,140,593 | 8/1992 | Hayashi | 371/9.1 |
| 5,155,729 | 10/1992 | Rysko et al. | 371/9.1 |
| 5,155,837 | 10/1992 | Liu et al. | 395/500 |
| 5,202,822 | 4/1993 | McLaughlin et al. | 371/9.1 |

OTHER PUBLICATIONS

M. Kruithof, "Call Load Sharing", *Proceedings of the National Electronics Conference*, vol. 32, pp. 16–18, Oct. 19 New York, New York.

R. L. Engram, et al., "Transparent Software and Hardware Changes in a Telecommunication System", Fifth International Conference on Software Engineering for Telecommunication Switching Systems, pp. 4–8, Jul. 1983.

R. Yacobellis, et al., "The 3B20D Processor & DMERT Operating System: Field Administration Subsystems", pp. 323–339, The Bell System Technical Journal, vol. 62, No. 1, Jan. 1983, Murray Hill, NJ.

(List continued on next page.)

*Primary Examiner*—Thomas C. Lee
*Assistant Examiner*—Sang Hui Kim
*Attorney, Agent, or Firm*—Charles L. Warren

[57] ABSTRACT

A second set of telecommunication devices is arranged to substantially mirror a first set of telecommunication devices in order to provide redundancy. First and second computer modules are included, respectively, in the first and second sets of devices wherein each module is capable of providing operating system control of the system and both modules initially operating with the same operating system. Only one of the computer modules controls the system at a given time. One of the devices of each pair of devices in the first and second sets of devices is isolated from the corresponding other device. The isolated computer module is loaded with a new operating system and tested by allowing the new operating system to control the isolated devices. This permits testing of the new operating system while maintaining uninterrupted control which is provided by the other devices operating under the same operating system. A further capability is provided for transferring control of the system to the isolated devices thereby transferring control from the same operating system to the new operating system with a minimum of service disruption.

11 Claims, 8 Drawing Sheets

OTHER PUBLICATIONS

R. Nichols, et al., *"No. 10A Remote Switching System: Control–Complex Architecture and Circuit Design"*, pp. 419–450, The Bell System Technical Journal, vol. 61, No. 4, Apr. 1982, Murray Hill, NJ.

J. Yates, et al., *"Data Administrative Methods for Rural ESS"*, International Conference on Communications, pp. 1–12, vol. 1. Jun. 1980, Seattle, Washington.

D. J. Troughton, et al., *"System X: The Processor Utility"*, British Telecommunications Engineering, vol. 3,, No. pp. 226–240, XP 000211494, Jan. 1985, London, England.

FIG. 3
OFFLINE BOOT

FIG. 5
SPLIT

FIG. 6
BOOT

FIG. 7
AM SIDE SWITCH

TELECOMMUNICATION SYSTEM WITH IMPROVED RECONFIGURATION FLEXIBILITY HAVING FIRST AND SECOND COMMUNICATION MODULES WHERE NEW OPERATING SYSTEM IS TESTED WITH ISOLATED SECOND COMMUNICATION MODULES

This application is a continuation of application Ser. No. 07/976,622, filed on Nov. 16, 1992, now abandoned.

BACKGROUND OF THE INVENTION

This invention is directed to telecommunications systems having at least partial hardware redundancy and addresses the ability of such a system to isolate a set of the hardware elements to accommodate changes in software control while other in-service hardware elements continue to operate under the control of existing software. This invention is particularly, but not exclusively, suited for use in a telecommunication switching system.

Telecommunications systems which must provide high reliability often employ redundant devices in order to maintain operation should one of the duplicated elements malfunction. A voting type redundancy system employs a plurality of like elements which concurrently perform identical tasks. The outputs from the like elements are compared and if all are the same, the determination is made that all are performing properly. If one of the outputs differs, a predetermined method is employed to select the output to be used. For example, where three like elements are utilized and one of such elements has an output which differs from the other two elements, the element with the differing output would typically be determined as the malfunctioning element and removed from service.

Another type of redundant system utilizes parallel redundant hardware elements wherein like elements are adapted to be interchangeable. In such a system one set of each of the elements is utilized to provide ongoing service while the other redundant set is maintained in a state of readiness (standby) to take over operation should a corresponding active element malfunction. Since like elements are utilized to provide redundancy, the active and corresponding standby elements are interconnected to facilitate a rapid change of state: standby to active; active to standby. Should the active element malfunction, the standby element should preferably have sufficient capacity to assume the total service load. The present invention is especially adapted for utilization in such a parallel hardware redundant system.

In a parallel redundant system in which microprocessor modules are included as redundant elements, each microprocessor module operates under the control of the same software system so that the redundant or standby microprocessor module can quickly assume the role of the active microprocessor module, should the latter malfunction or otherwise need to be taken out of service. Because the active microprocessor module controlled both the active and standby elements, and because of the interconnections between active and standby elements, prior telecommunication systems presented difficulties when new operating software was to be installed. Testing a new telecommunications operating system (software) normally required that the entire telecommunications system cease further processing while the new software was loaded and then executed. Since such systems normally initiated a complete reboot cycle to load the new software, the system remained out of service until the boot cycle was completed including reinitialization of software and hardware parameters and reestablishing communications with the other elements in the system. In a complex telecommunications switching environment, service outages associated with rebooting of the system may last for a substantial number of minutes.

What if the newly booted software in such a system failed to operate properly in the system? Typically, after waiting for the load of the new software and determining that it did not function properly, the system was reloaded with the prior software. Thus, an unsuccessful boot of new software caused a service outage of a substantially longer period of time since the system had to be effectively booted twice. A need exists for an improvement in such systems which will minimize such out-of-service periods.

SUMMARY OF THE INVENTION

It is an object of the present invention to provide an improved method and telecommunications system having parallel hardware redundancy which minimizes such service outages.

In accordance with the present invention, an embodiment of a telecommunications switching system is provided which minimizes service outages associated with installing new system operating software. In a system in which first elements and second mirror redundant elements are utilized, one of each of the element pairs is isolated from the other corresponding element. This isolation may require the transfer of certain services to the other element in order to accomplish the desired isolation of elements to achieve an active or on-line set and an inactive or off-line set. Communications between the off-line and on-line corresponding elements is interrupted in order to provide the isolation. Further, communications between the off-line elements and other external hardware elements is isolated. This permits the off-line microprocessor module and corresponding off-line elements to be rebooted with different (new) software than that utilized for the on-line set of elements. The boot process is permitted to execute substantially to conclusion in order to fully test the compatibility of the new software and the off-line elements of the system in order to determine the operability of the system under the new software. During this test the on-line elements continue to provide service utilizing the existing software for control. If the new software boot is determined to be unsuccessful, the telecommunications system has not suffered a service outage in order to determine that a problem exists with the new software. If the test of the new software on the off-line set is successful, the off-line set can be quickly converted to become the on-line set with a minimum of service outage during the transition. Once the transition has been made the old on-line set (now off-line set) can be reloaded with the new software and function as the standby redundant set of elements.

DETAILED DESCRIPTION

Figure 1:
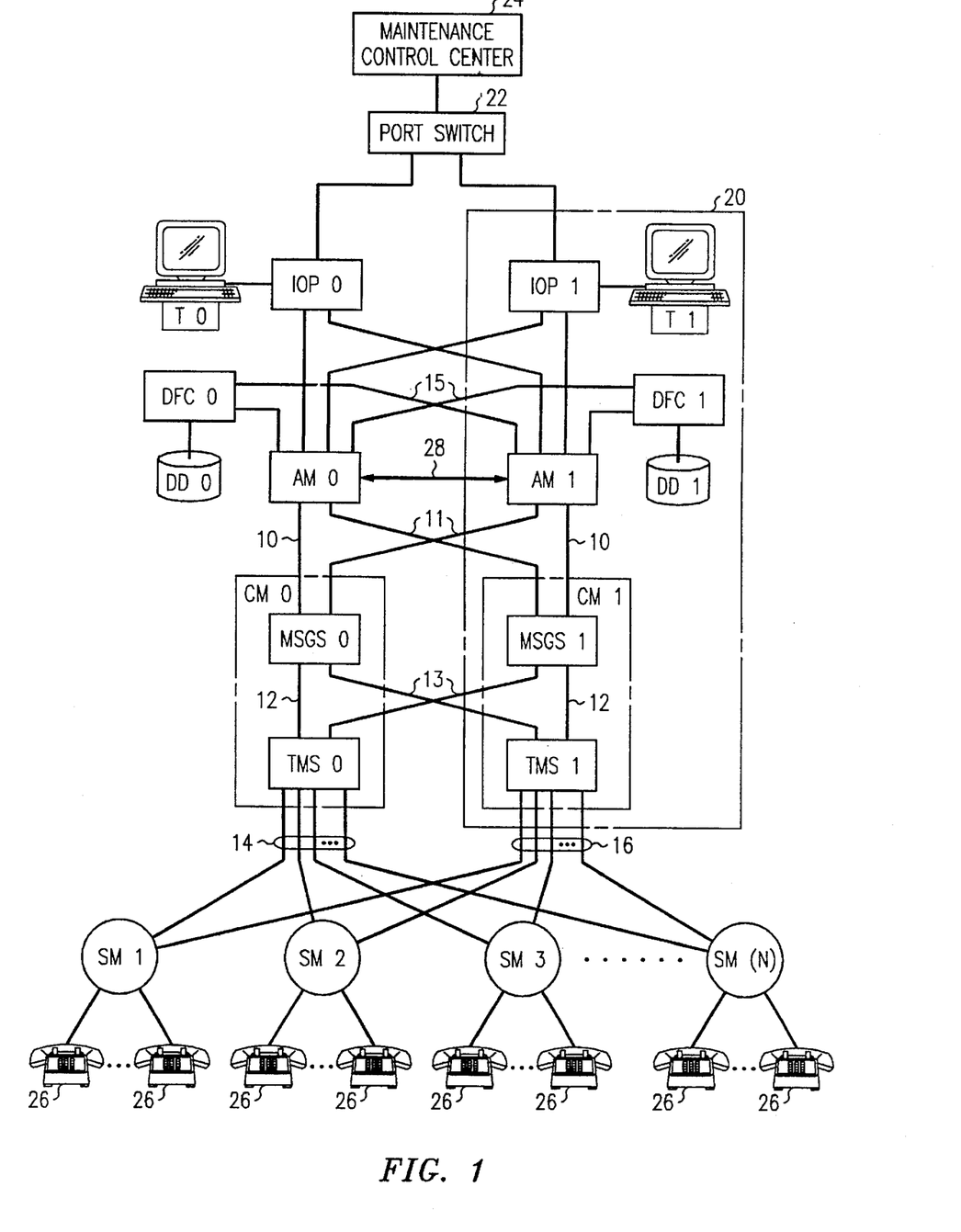
FIG. 1 is a block diagram of a telecommunications system which incorporates an embodiment of the present invention.

FIG. 1 illustrates an exemplary telecommunications switching system which incorporates an embodiment of the present invention. In the illustrative example the switching system preferably comprises an AT&T 5ESS® switching system.

The illustrated system includes an access terminal T0, an input/output processor IOP0, a disk drive DD0, a disk file controller DFC0, an administrative (computer) module AM0, a communications module CM0 including message switch MSGS0 and time multiplex switch TMS0. Redundant hardware 20 contains corresponding like elements (mirror elements) identified by the suffix "1" as opposed to the elements identified by the suffix "0". A port switch 22 couples a maintenance control center (MCC) 24 to one of the input/output processors. A plurality of service modules SM1 through SM(n) are each coupled to the time multiplex switches TMS0 and TMS1, and are also coupled to a plurality of customer premises equipment (CPE) 26 such as a telephone.

Since these elements and their operation in a 5ESS telecommunications switch as shown are generally known, only a brief description of the elements is provided in order to provide a background for understanding the illustrative embodiment of the present invention. The AM's supply system-level control required for the switching system and perform other support functions including craft maintenance access, software recovery and initialization. Prior to this invention, the same system software was utilized by both AM's and loaded from the respective disk drives via the corresponding disk file controllers. The IOP's provide interfaces with operational support peripherals which may consist of terminals, printers or other peripherals (T0, T1) and support access via port switch 22 to a maintenance control center 24 which provides a human-machine interface that displays system status and provides a mechanism for manual control over system operations. Each IOP and DFC is connected to both AM's permitting access by each AM to elements coupled to the IOP's and DFC's. A direct communication channel 28 directly connects AM0 to AM1. Each AM is also connected via channels 10 and 11 to each CM so that administrative instructions and routing decisions made by the AM can be transmitted to either CM.

Each CM includes a MSGS which transfers call processing and administrative messages via channels 12, 13, 14 and 16 between the SM's and the AM, and between SM's. The TMS in each CM performs time-shared space-division switching. The TMS allocates a time slot for communications between users, for example, between one of CPE 26 and another CPE 26. Each SM includes a time slot interchanger (not shown) which performs time-division switching of communications to and from the CPE's 26. The *AT&T Technical Journal,* Vol. 64, July-August 1985, No. 6, Part 2, entitled "The 5ESS Switching System" provides additional operational description of a 5ESS telecommunications switch.

The MSGS's are coupled via channels 12 and 13 to each TMS. The TM's are coupled via channels 14 and 16 to each SM. The direct and cross-coupling of these elements provides the capability of substituting one element for a malfunctioning mirror element. In the illustrative example, the elements with the 0 suffix constitute the active or on-line elements and the corresponding elements with a 1 suffix identified as system 20 are inactive or off-line. Although the on-line elements in this illustrative example are connected in a direct straight-down connection manner, it will be apparent that either of the like elements at any level could be utilized as the active and off-line elements, respectively.

Figure 2:
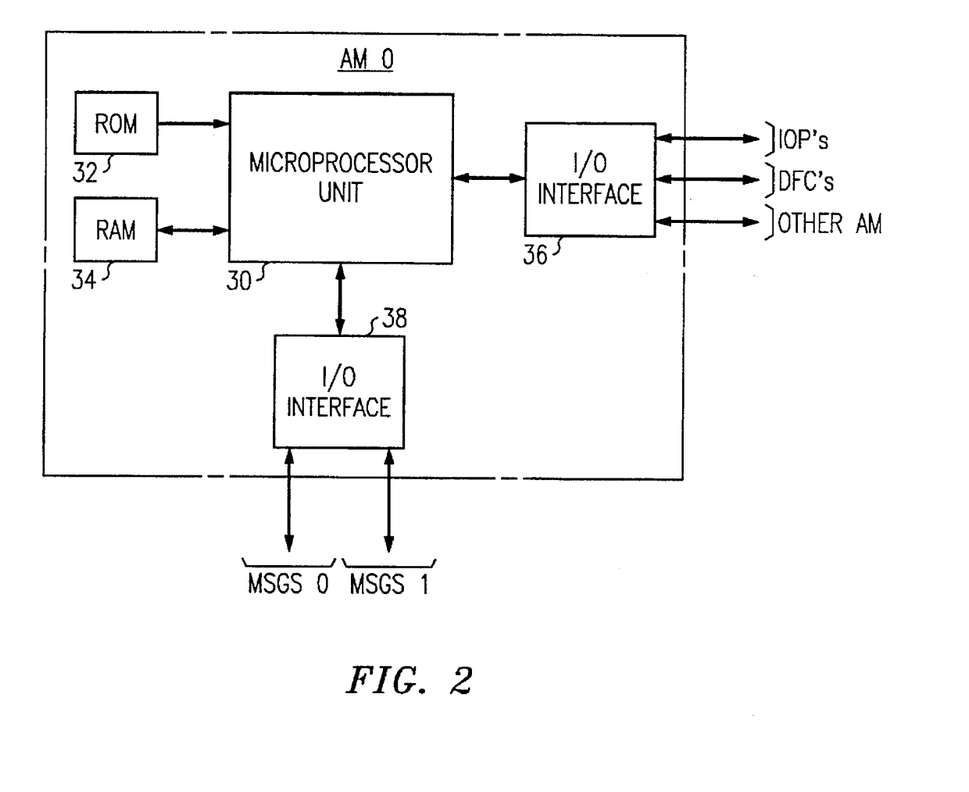
FIG. 2 is a block diagram illustrating an administrative module (AM) as shown in FIG. 1.

FIG. 2 illustrates a block diagram of administrative module AM0. It includes a microprocessing unit 30 which is coupled to read-only memory (ROM) 32, random access memory (RAM) 34, input/output interface 36 which links the MPU 30 to the IOP's, DFC's, and AM1, input/output interface 38 which links MPU 30 to the MSGS's. The ROM 32 provides additional boot-up core program utilized for MPU 30 during initialization and software loading of an operating system program stored on DD0 or DD1. Portions of the operating program, operational tables and data and other information is stored in RAM 34 during operation of the system.

Figure 3:
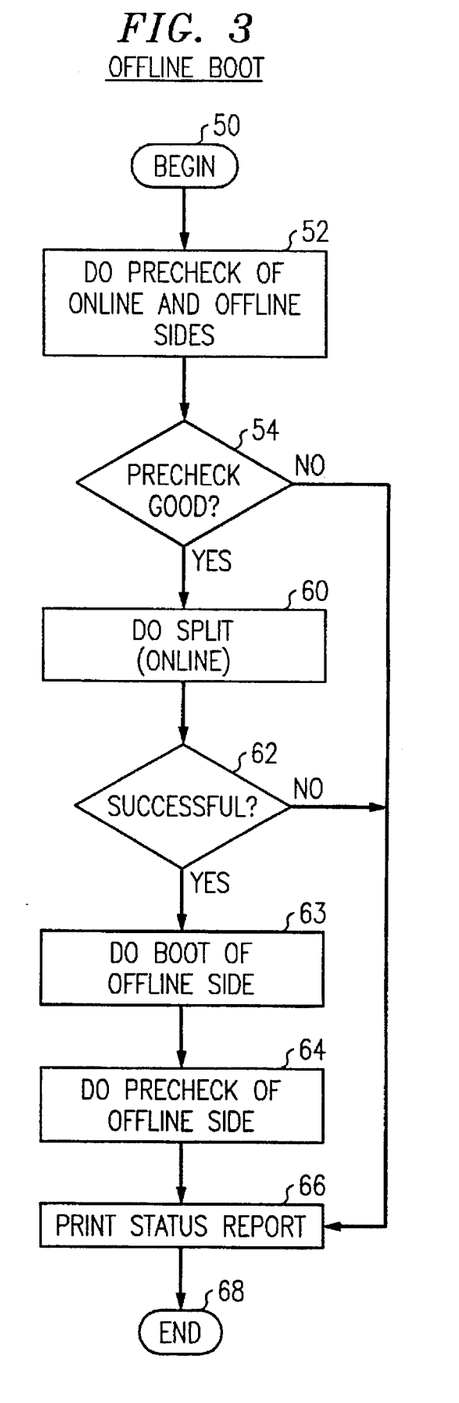
FIG. 3 is a flow diagram illustrating steps for executing an off-line boot process in accordance with the present invention.

FIG. 3 is a flow diagram of an exemplary method for implementing an off-line boot process for the illustrative embodiment as shown in FIG. 1. Off-line boot refers to the ability to isolate a group of hardware redundant elements from their corresponding active counterparts and from other external peripherals so that this off-line set of elements can be loaded with new system software and so that the new loaded software can be executed substantially to conclusion to verify its operability. For example, if the elements defined by system 20 constitute off-line (isolated, not available for service) elements, the corresponding counterpart elements with the zero suffix constitute on-line elements, i.e. active and in-service elements.

In FIG. 3 the off-line boot process starts at BEGIN 50 which is followed by the execution of a precheck of the on-line and off-line sides (elements). Generally, the precheck involves identifying on-line and off-line hardware and a determination if such hardware and processes operating with the hardware are sufficiently operational to permit an off-line boot without an interruption of service. This action will be described further with regard to FIG. 4. Assuming that the determination step 54 determines that the precheck resulted in satisfactory results (good), a split process is initiated at step 60. The split process generally involves the removal of off-line hardware and updating of system data in the on-line AM. Additional explanation regarding this action is provided with regard to FIG. 6. If step 62 determines that the split was successful, a boot of the off-line side is initiated by step 63, followed by a precheck of the off-line side as indicated by step 64. This precheck is substantially identical to the previous precheck of step 52 except that it is conducted with regard to the off-line side. In step 66 a status report is printed relating to the status of off-line equipment and parameters. A negative determination by steps 54 or 62 will abort the remainder of the steps and will print a status report as indicated at 66 which can be utilized to evaluate conditions which led to the failure to complete the off-line boot process. The process terminates at END 68.

A successful completion of the off-line boot process can best be visualized by reference to FIG. 1. The on-line elements (with a zero suffix) remain operational under the existing software and continue to process and handle calls and other requirements initiated by CPE 26 via the SM's. Although the parallel redundant equipment 20 is removed from service and AM1 is loaded with new system software, service to users with existing calls or users initiating new calls is not adversely impacted. At the completion of the off-line boot process, communication channels 11, 13, and 15 are inactivated thereby preventing cross-coupling of commands or receipt of instructions which could cause conflicts due to the different system software. Also at the completion of the off-line boot process, channels 16 are removed from service thereby isolating TMS1 from the SM's. Since the SM's can operate independent of TMS1 with regard to maintaining stable calls, such ongoing calls will not be adversely affected. Any new originations or requests for service from the SM's following the off-line boot will be processed via channels 14 and the on-line devices. Communication channels 10 and 12 remain active thereby maintaining communications within the off-line and on-line elements. Thus, the off-line boot process in accordance with the present invention permits new operational software to be loaded into a redundant set of hardware which has been isolated from the on-line hardware and from peripheral units which could be adversely impacted, i.e. the SM's. This facilitates testing of the new software by allowing it to execute on the off-line equipment to determine if it is operational on equipment at a given location without adversely impacting service to customers in the event that the new software proves to be unsatisfactory.

Figure 4:
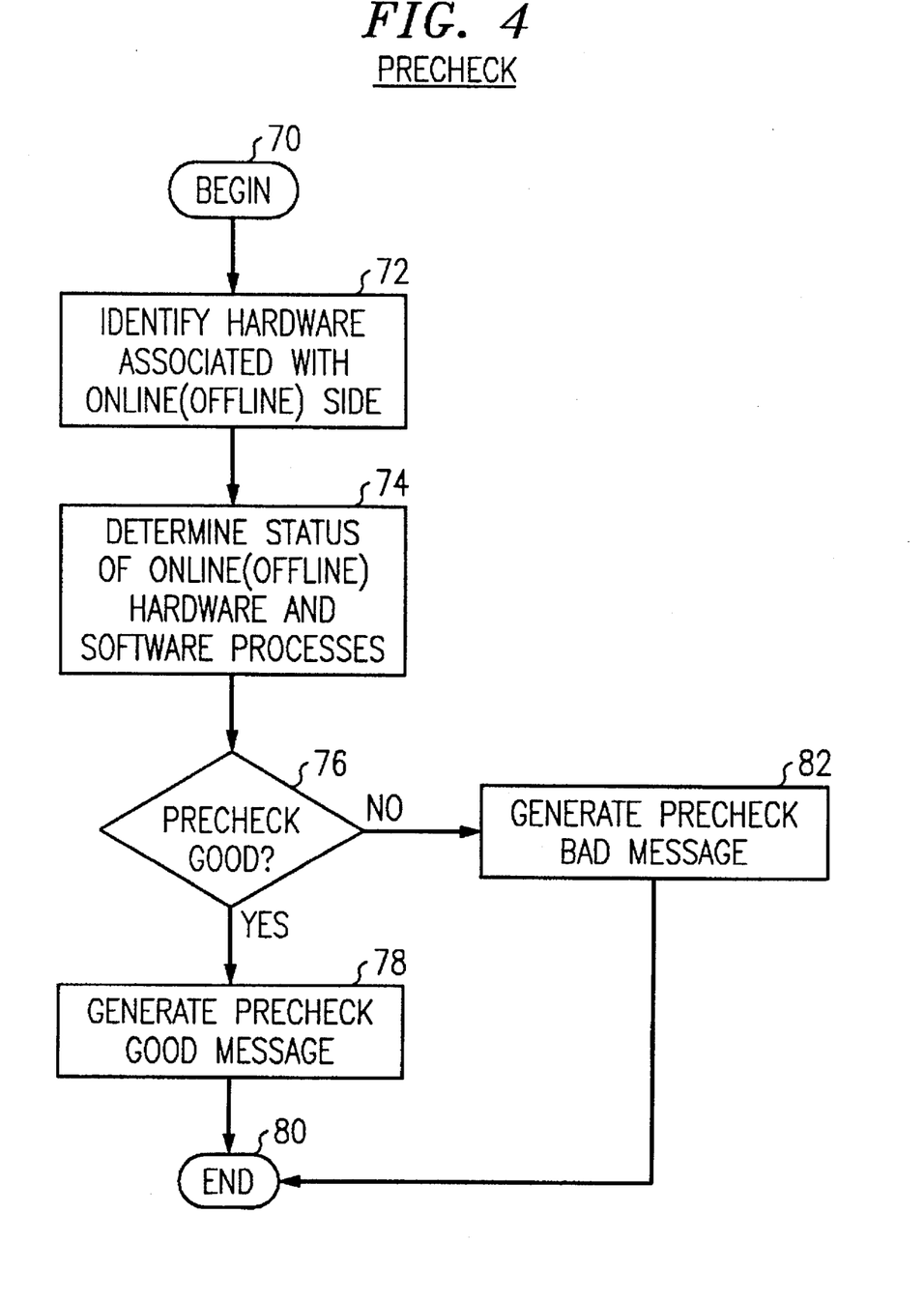
FIG. 4 is a flow diagram illustrating steps for performing a precheck as referenced in FIG. 3 in accordance with an embodiment of the present invention.

FIG. 4 is a flow diagram of exemplary steps in accordance with the present invention illustrating a precheck process of either the on-line or off-line side as referenced in FIG. 3. Starting at BEGIN 70, the hardware to be associated with one side is identified in step 72. For a precheck of the on-line side, the associated on-line hardware is identified; a precheck associated with the off-line side will identify hardware associated with the off-line side. The identification process can rely on a predetermined segregation pattern of redundant equipment such as segregating such equipment as illustrated in FIG. 1. Alternatively, hardware equipment to be associated with an on-line or off-line side can be identified based on the degree of utilization of each corresponding element where both corresponding elements are used concurrently for normal service. In step 74 a determination is made of the status, loading, and service associated with the on-line/off-line hardware and software processes. Since the goal of the off-line boot process is to be non-interruptive with regard to customer service, it will be apparent that hardware or software conditions may exist which would make continuation of the off-line boot impossible without disrupting service. For example, a faulty redundant element could cause a loss of service or an off-line boot failure. In step 76 a determination is made if the precheck is okay. A YES determination by step 76 causes the generation of a precheck-good message by step 78 which provides a precheck reply as utilized in FIG. 3. A NO determination by step 76 results in the generation step 82 of a precheck-bad message which is utilized in FIG. 3. The illustrated process terminates at END 80.

Figure 5:
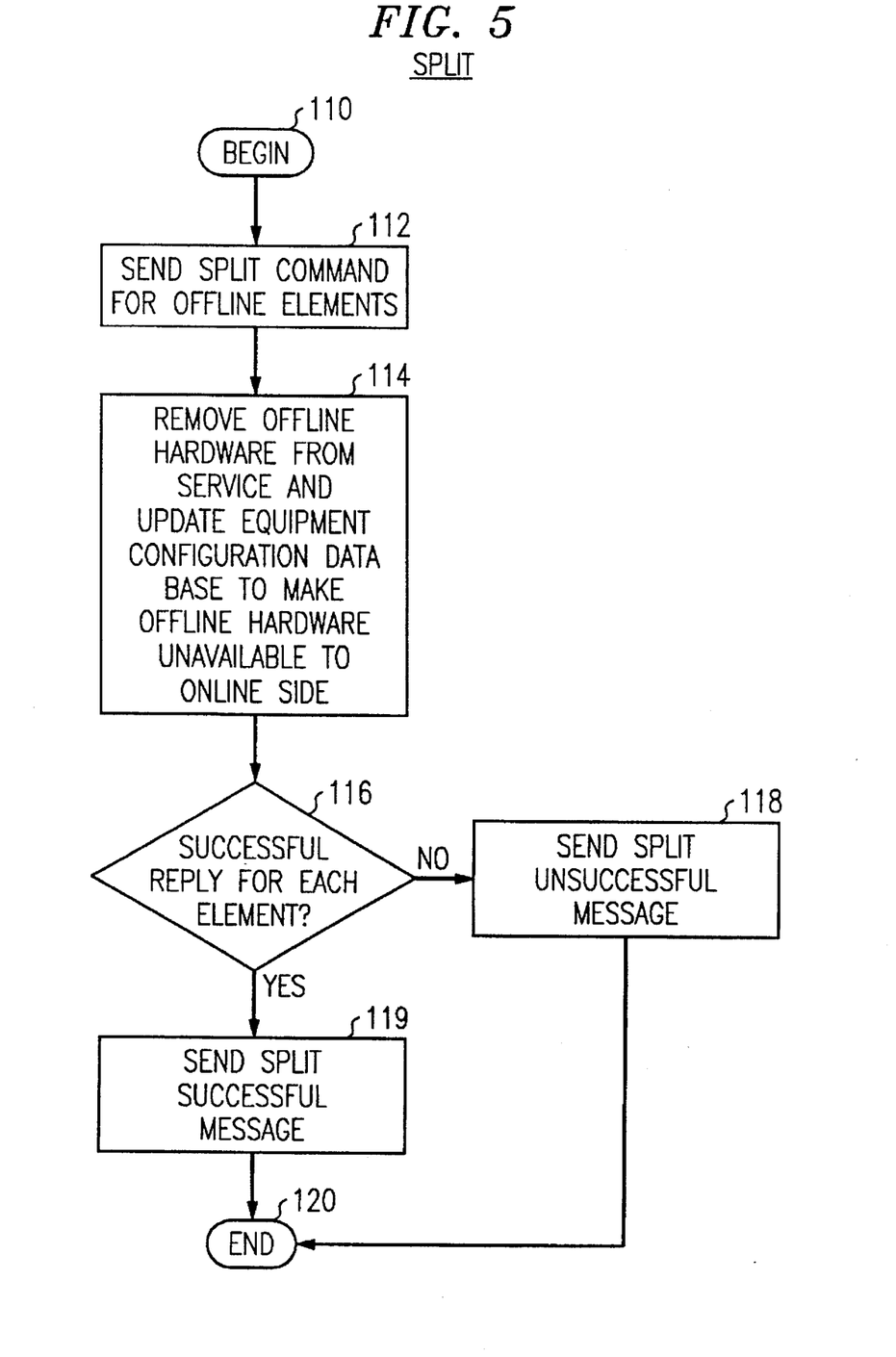
FIG. 5 is a flow diagram illustrating steps for performing a split function as referenced in FIG. 3 in accordance with an embodiment of the present invention.

FIG. 5 is a flow diagram of exemplary steps to carry out a split function as referenced in step 60 of FIG. 3. Starting with BEGIN 110, a split command is issued for the off-line elements as indicated in step 112. In response to the command, the elements are logically isolated from their corresponding like elements. For example, in the illustrative embodiment as shown in FIG. 1, communication channels 11, 13, and 16 are logically inhibited thereby terminating communications between the on-line and off-line side, and preventing communication between the off-line side and the associated SM's. In step 114, the corresponding hardware is removed from service and the equipment configuration databases are updated to make the off-line hardware unavailable to the on-line side. In step 116 a determination is made if a successful reply has been received for each of the elements in response to the split command. A NO determination which indicates at least one element did not successfully complete this process, results in an unsuccessful split message being sent as indicated in 118; this leads to conclusion of this process as indicated at END 120. A YES decision by step 116 indicating successful replies have been received from all such elements, results in a successful message being sent as indicated in step 119. The process then terminates at END 120.

Figure 6:
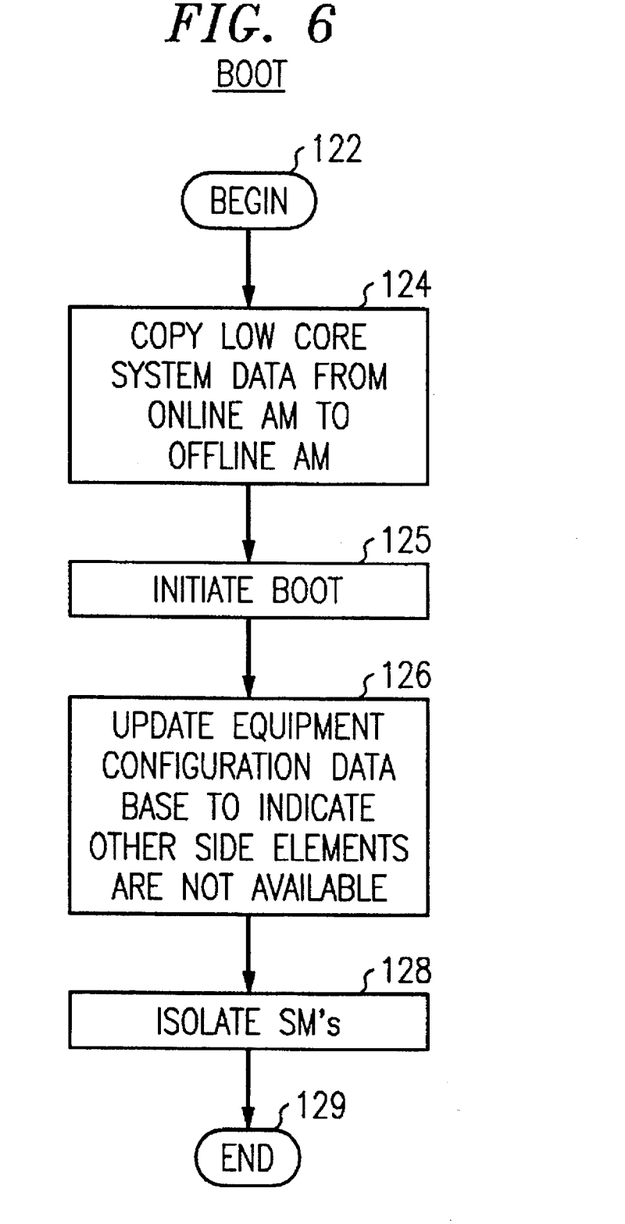
FIG. 6 is a flow diagram illustrating a boot of the off-line side as referenced in FIG. 3 in accordance with an embodiment of the present invention.

FIG. 6 is a flow diagram of boot steps used to load and initialize the off-line AM with the new software. Starting at BEGIN 122, low core system data is copied from the on-line AM to the off-line AM as part of the boot process as indicated in step 124. In step 125 the boot process is initiated by the on-line AM sending over channel 28 a boot command to the off-line AM. In step 126 the equipment configuration database is updated to indicate the other side elements are not available, and to disable possible interrupts which could be generated from the other side. The SM's are isolated from the off-line TMS as indicated in step 128. Isolation is accomplished by logically inhibiting communications between the SM's and the off-line TMS. This process terminates at END 129.

Figure 7:
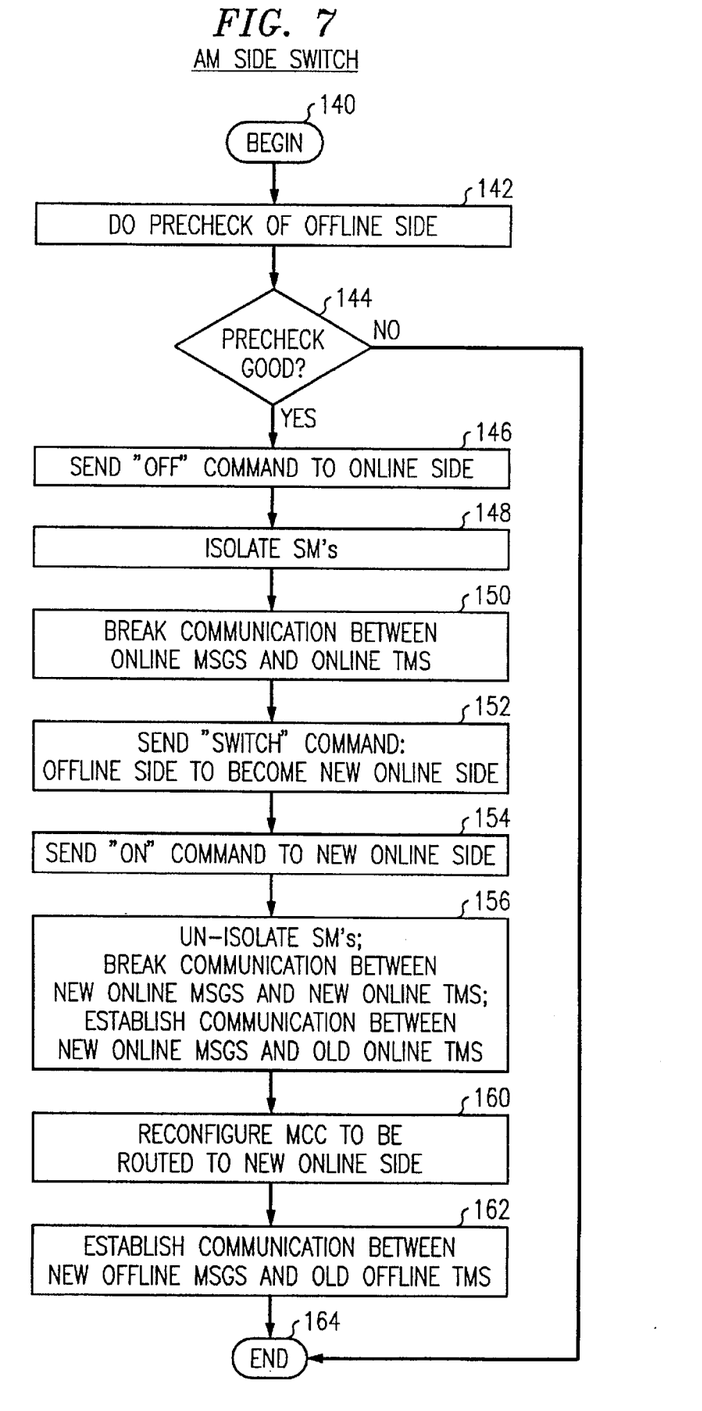
FIG. 7 is a flow diagram illustrating an administrative module sideswitch function in accordance with an embodiment of the present invention.

FIG. 7 is a flow diagram of an exemplary method for accomplishing an AM sideswitch, i.e. a transfer of service responsibility and control from the on-line side to the off-line side following a successful off-line boot. This process could be initiated by craft personnel following a determination of a satisfactory off-line boot. The AM sideswitch process enables a rapid transition from existing system software to new system software and minimizes the period of a service disruption to users.

Starting with BEGIN 140, a precheck of the off-line side is conducted by step 142. In step 144 the precheck parameters are checked for success. If a NO determination is made by step 144, the process terminates at END 146. If a YES determination is made, the process continues to step 146. In step 146 an OFF command is sent to the on-line side which causes the SM's to be isolated as indicated in step 148. Also, in response to the OFF command, communications between the on-line MSGS and the on-line TMS is logically broken as indicated in step 150. On the completion of step 150, the telecommunications system as shown in FIG. 1 enters a loss-of-service interval. During this time a user of a CPE 26 will not be able to initiate any new requests for service; however, existing communications between users will be maintained since the SM's are capable of maintaining stable (completed) calls in association with a TMS.

In step 152 a SWITCH command is sent to the off-line AM in the system causing the off-line side to become the new on-line side. The old on-line AM is switched to become the off-line AM. In step 154 an ON command is sent to the new on-line side thereby initiating the process which will enable the new on-line elements to begin providing service. In step 156 the SM's are un-isolated. That is, communication is broken between the new on-line MSGS (MSGS 1) and the new on-line TMS (TMS 1). Communication is established between the new on-line MSGS (MSGS 1) and the old on-line TMS (TMS0). This action effectively leaves the old on-line TMS to function as the new on-line TMS. The TMS's are not exchanged during the sideswitch operation in view of the substantial quantity of data and reconfiguration which would be required. At this time, service is reestablished to CPE users, i.e. new calls can be made.

In step 160 the MCC is reconfigured so that it is routed to the new on-line side to enable craft personnel to continue to monitor and provide manual commands to the system. In step 162 communication is established between the new off-line MSGS (MSGS 0) and the old off-line TMS (TMS1). Thus, following the AM sideswitch, TMS1 is coupled to AM0 via MSGS 0; TMS0 is coupled to AM1 via MSGS 1. The process concludes at END 164.

Figure 8:
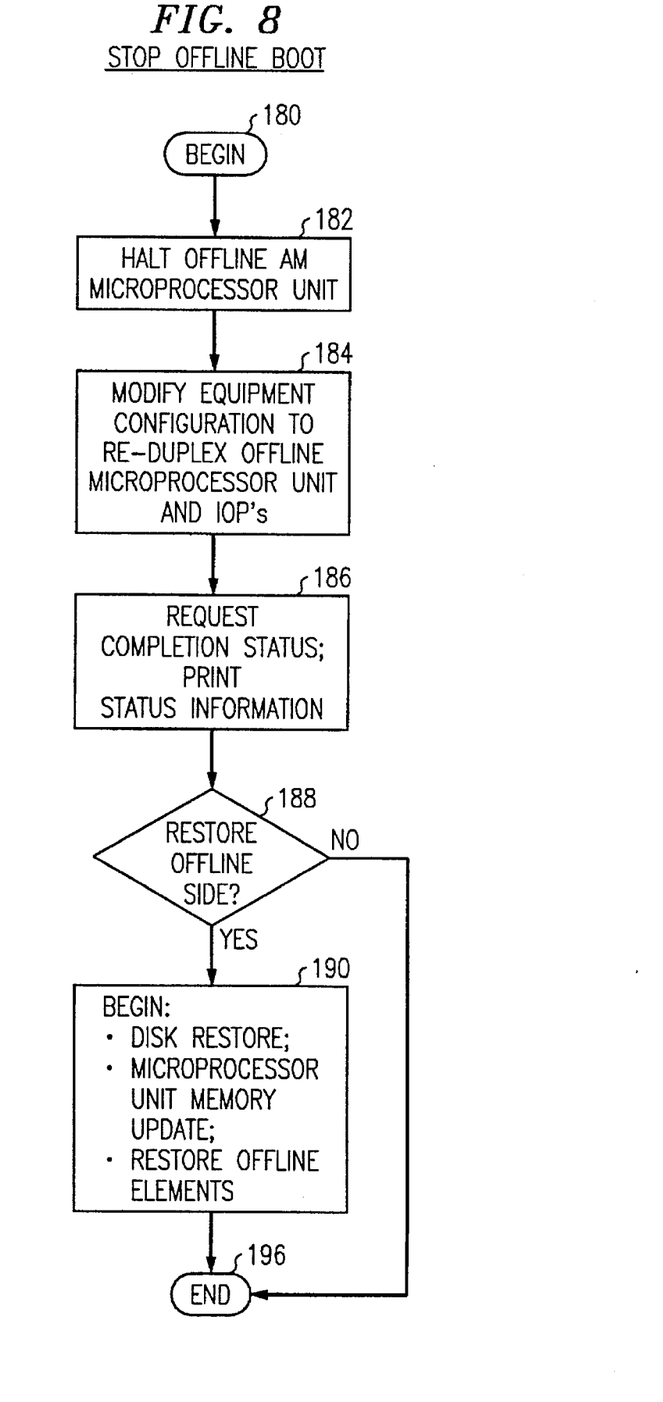
FIG. 8 is a flow diagram illustrating the stopping of an off-line boot process in accordance with an embodiment of the present invention.

FIG. 8 is a flow diagram of illustrative steps which can be employed to stop an off-line boot. These steps could be initiated by craft personnel to: terminate an unsuccessful off-line boot process; and terminate an AM sideswitch process so that the new off-line elements are un-isolated from the new on-line elements and made ready for service.

Starting with BEGIN 180, a command is sent to the off-line AM to halt its MPU as indicated in step 182. In step 184 the equipment configuration database is modified to reduplex all off-line elements. The equipment configuration database is updated to permit normal (non-isolated) operations. In step 186 a completion status request is automatically generated and the status information is printed for analysis by craft personnel. In step 188 a determination is made as to whether to restore the off-line side. A YES determination by step 188 results in disk restoral, MPU memory update and restoring of off-line elements, i.e. restoral of off-line elements to standby status as indicated by step 190. This process concludes at END 196. A NO determination by step 188 results in the actions associated with step 190 being bypassed thereby allowing the craft personnel an opportunity to initiate another off-line boot process immediately.

In accordance with the illustrative embodiment of the present invention, new system software can be effectively tested to substantial completion on an isolated set of parallel redundant equipment. This test can be accomplished without a service disruption. This invention contemplates that the new operating system may comprise a different operating system program used for the off-line boot from that which was last used to boot the on-line side, and the same operating system program as operating on the on-line side but with different data files used in the off-line boot process than was used when the on-line side was booted. Either type of new system software could result in a boot failure and hence make testing in accord with this invention useful. Assuming a successful test of new system software on the off-line side, a sideswitch process can be initiated to rapidly transfer service responsibility from the old system software control to the new system software control thereby, minimizing time of service outage to users. It will be apparent to those skilled in the art that the described embodiment can be used to load and test new software whether or not the sideswitch process is utilized. Although each element of the mirror pairs of elements must be capable of providing the same basic functions required for system operation, one of the elements may include additional functions not supported by the other corresponding element. In this situation such additional functions will not be protected by redundant hardware.

Another aspect of this invention resides in the ability of the off-line side to conduct a self-boot test of the new software. A "self-boot" means the capability of loading a program and then executing that program without assistance from programs operating on other modules, e.g. the off-line AM self-boots itself with new software without assistance from the on-line AM. Different operating parameters are utilized for a self-boot than where an operational module is loaded with a new program by another module. Thus, executing a self-boot of a module provides a more thorough test of the module than modifying or substituting programs or parameters in an operational module.

Although an embodiment of the present invention has been described and illustrated herein, the scope of the invention is defined by the claims which follow.

We claim:

1. A telecommunications system that controls the interconnection of communication channels, the system comprising:,
   a first set of telecommunication devices;
   a second set of telecommunication devices arranged to substantially mirror said first set of devices; said first and second set of devices coupled to said communication channels;
   said first and second set of devices comprising first and second computer modules, respectively, said first and second computer modules each being physically independent and capable of providing operating system control for said telecommunications system, said first and second computer modules initially operating with the same operating system, said first and second computer modules connected and providing control instructions to first and second communication modules, respectively;
   means for selecting one of said first and second computer modules to control said communication system, only said one of said first and second computer modules controlling said communication channels at any given time;
   means for isolating said one of said first and second computer modules and a corresponding one of said first and second communication modules from the other of said computer modules and communication modules;
   means for inhibiting said other computer module and other communication modules from communicating with said communication channels;
   means for loading the other computer module with a new operating system and testing the operation of the new operating system by having the other computer module operate and communicate information with said isolated other communication modules, uninterrupted control of said communication channels by said one communication modules being maintained while interaction of said new operating system with said isolated communication modules is tested.

2. The system according to claim 1 further comprising means for transferring control of said one communication modules from said one computer module to said other computer module with a minimum of service disruption so that control of the communication channels is provided by said new operating system.

3. The system according to claim 1 wherein said inhibiting means inhibits said isolated other communication modules from communicating with said one communication modules in order to prevent possible interference with the control being provided by the one computer module.

4. The system according to claim 1 wherein said loading means comprises means for self-booting said isolated other computer module with the new operating system.

5. A method for testing the operation of a new software operating system in a telecommunications system that controls the routing of information through communication channels, the system including first and second sets of telecommunication devices coupled to said communication channels, the second set being arranged to substantially mirror said first set, the first and second set of devices comprising first and second computer modules, respectively, each of the modules being physically independent and capable of providing operating system control for the telecommunications system, the first and second computer modules initially operating with the same operating system, said first and second computer modules connected and providing control instructions to first and second communication modules, respectively, the method comprising the steps of:

selecting one of said first and second computer modules to control said communications system, only said one of said first and second computer modules controlling said communication channels at a given time;

isolating said one of said first and second computer modules and a corresponding one of said first and second communication modules from the other of said computer modules and communication modules;

inhibiting the other computer module and other communications modules from communicating with the communication channels;

loading the other computer module with said new software operating system;

testing the operation of the new operating system by having the other computer module operate and communicate information with said isolated other communication modules, uninterrupted control of the communication channels by said one communication modules being maintained while interaction of said new operating system with said isolated communication modules is tested.

6. The method according to claim 5 further comprising the step of transferring control of said one communication module from the one computer module to the other computer module with a minimum of service disruption so that control of the communication channels is provided by said new operating system.

7. The method according to claim 5 wherein said inhibiting step further comprises the step of inhibiting the isolated from communicating with the one communication modules to prevent possible interference with the control being provided by the one computer module.

8. The method according to claim 5 wherein said loading step includes said isolated other computer self-booting to load the new software operating system.

9. A computing system having at least partial hardware redundancy comprising:

a first and second set of computing devices comprising first and second computer modules, respectively, said first and second computer modules each being capable of providing operating system control for said computing system, said first and second communication modules initially operating with the same operating system, said first and second computer modules connected and providing control instructions to first and second communication modules, respectively;

means for selecting one of said first and second computer modules to control said computing system, only said one of said first and second computer modules controlling said system at any given time;

means for isolating said one of said first and second computer modules and a corresponding one of said first and second communication modules from the other of said computer modules and communication modules;

means for inhibiting said other computer module and other communication modules from communicating with said one communication modules;

means for loading the other computer module with a new software operating system;

means for testing operation of said new operating system by having the the other computer module operate and communicate information with said isolated other computer module, uninterrupted control by said one computer module being maintained while interaction of said new operating system with said isolated computer modules is tested.

10. The system according to claim 9 further comprising means for transferring control of said one communication modules from said one computer module to said other computer module so that control of the computing system is provided by said new operating system.

11. The system according to claim 9 wherein said loading means comprises means for self-booting said isolated other computer module with the new software operating system.

* * * * *